(12) United States Patent
Kahle

(10) Patent No.: US 11,287,300 B2
(45) Date of Patent: Mar. 29, 2022

(54) MEASURING DEVICE FOR MEASURING A MASS FLOW RATE OF A MATERIAL FLOW, METHOD AND MEASURING SYSTEM

(71) Applicant: Schenck Process Europe GmbH, Darmstadt (DE)

(72) Inventor: Jens Kahle, Dreieich (DE)

(73) Assignee: Schenck Process Europe GmbH, Darmstadt (DE)

( * ) Notice: Subject to any disclaimer, the term of this patent is extended or adjusted under 35 U.S.C. 154(b) by 38 days.

(21) Appl. No.: 16/883,441

(22) Filed: May 26, 2020

(65) Prior Publication Data

US 2020/0284634 A1    Sep. 10, 2020

Related U.S. Application Data

(63) Continuation of application No. PCT/EP2018/078825, filed on Oct. 22, 2018.

(30) Foreign Application Priority Data

Nov. 23, 2017   (DE) ...................... 10 2017 010 850.1

(51) Int. Cl.
  *G01F 1/82*  (2006.01)
(52) U.S. Cl.
  CPC ....................... *G01F 1/82* (2013.01)
(58) Field of Classification Search
  None
  See application file for complete search history.

(56) References Cited

U.S. PATENT DOCUMENTS

| | | | |
|---|---|---|---|
| 5,088,331 A | 2/1992 | Fassbinder | |
| 7,077,013 B2 | 7/2006 | Friedrich | |
| 7,168,328 B2 | 1/2007 | Kahle | |
| 2006/0042401 A1* | 3/2006 | Kahle | G01F 1/8454 73/861.353 |
| 2008/0223624 A1* | 9/2008 | Hax | G01F 1/8454 177/16 |

FOREIGN PATENT DOCUMENTS

| | | |
|---|---|---|
| DE | 102 53 078 B3 | 4/2004 |
| DE | 10 2005 018 917 A1 | 11/2006 |
| EP | 0 432 627 A1 | 6/1991 |
| EP | 1 619 481 A1 | 1/2006 |

* cited by examiner

*Primary Examiner* — Paul M. West
*Assistant Examiner* — Mark A Shabman
(74) *Attorney, Agent, or Firm* — Muncy, Geissler, Olds & Lowe, P.C.

(57) ABSTRACT

A measuring device for measuring a mass flow rate of a material flow having a rotatably mounted, bladed measurement wheel for deflecting the material flow, a drive shaft for driving the measurement wheel, an output shaft rigidly connected to the measurement wheel, a bearing sleeve, surrounding at least part of the output shaft, for the rotatable mounting of the output shaft, a force-measuring apparatus, and a gearbox which has a first gearbox element and a second gearbox element, and an intermediate element for transmitting a torque from the first gearbox element to the second gearbox element. The measuring device has a rocker which is rigidly connected to the bearing sleeve and on which the intermediate element of the gearbox is mounted. The force-measuring apparatus is connected to the rocker, so that a force transmitted to the rocker can be measured by the force-measuring apparatus.

20 Claims, 6 Drawing Sheets

MEASURING DEVICE FOR MEASURING A MASS FLOW RATE OF A MATERIAL FLOW, METHOD AND MEASURING SYSTEM

This nonprovisional application is a continuation of International Application No. PCT/EP2018/078825, which was filed on Oct. 22, 2018, and which claims priority to German Patent Application No. 10 2017 010 850.1, which was filed in Germany on Nov. 23, 2017, and which are both herein incorporated by reference.

BACKGROUND OF THE INVENTION

Field of the Invention

The present invention relates to a measuring device for measuring a mass flow rate of a material flow and to a method for operating such a measuring device. In addition, the invention relates to a measuring system having such a measuring device and to a method for operating such a measuring system. Moreover, the invention relates to a metering system having such a measuring device.

Description of the Background Art

Conveyor belt scales, measuring chutes, or baffle plates are used, among other things, in practice to determine a mass flow rate of a material flow, such as, for example, a bulk material flow.

Measuring devices that operate according to the Coriolis principle are preferably used in particular for the highly precise measurement of the mass flow rate of a material flow. To determine the mass flow rate of a material flow, these measuring devices use the Coriolis force that occurs when the material flow is accelerated radially outwards by a bladed measurement wheel which rotates at a constant angular velocity. The Coriolis force results in a braking torque, which is proportional to the mass flow rate, on the measurement wheel.

A measuring device for measuring a mass flow rate of a material flow according to the Coriolis principle is known, for example, from DE 102 53 078 B4, which corresponds to U.S. Pat. No. 7,168,328, which is incorporated herein by reference. This measuring device comprises a bladed measurement wheel for deflecting the material flow, an output shaft rigidly connected to the measurement wheel, a drive shaft for driving the measurement wheel, a bearing sleeve surrounding the output shaft, a force-measuring apparatus, and a gearbox which has a first gearbox element rigidly connected to the drive shaft, a second gearbox element rigidly connected to the output shaft, and an intermediate element for transmitting a torque from the first gearbox element to the second gearbox element. The first and second gearbox element and the intermediate element are each designed as a spur gear. The reaction force acting on the output shaft in the measurement operation according to the Coriolis principle is transmitted to the intermediate element via the second gearbox element. The force acting on the intermediate element is transmitted to the force-measuring apparatus with the aid of a force-transmitting arm which is rotatably mounted in the housing of the measuring device and on which the intermediate element is mounted. Moreover, this measuring device comprises an additional gearbox with further spur gears, one of which is rigidly connected to the bearing sleeve. To minimize friction-induced disturbing forces, the bearing sleeve is driven with the aid of the additional gearbox at a speed that corresponds to the output shaft speed.

A disadvantage of the measuring devices from the conventional art is that this measuring device is structurally very complex, so that its production is associated with high costs and labor.

SUMMARY OF THE INVENTION

It is therefore an object of the present invention to enable a structurally simple structure in a measuring device. Further objects of the invention are to provide a measuring system having such a measuring device, to specify a method for operating such a measuring system, and to provide a metering system having such a measuring device.

The measuring device of the invention for measuring a mass flow rate of a material flow, in particular a bulk material flow, in accordance with the Coriolis principle, comprises a rotatably mounted, bladed measurement wheel for deflecting the material flow, a drive shaft for driving the measurement wheel, an output shaft rigidly connected to the measurement wheel, a bearing sleeve, surrounding at least part of the output shaft, for the rotatable mounting of the output shaft, a force-measuring apparatus, and a gearbox which has a first gearbox element rigidly connected to the drive shaft, a second gearbox element rigidly connected to the output shaft, and an intermediate element for transmitting a torque from the first gearbox element to the second gearbox element. In addition, the measuring device of the invention comprises a rocker which is rigidly connected to the bearing sleeve and on which the intermediate element of the gearbox is mounted, wherein the force-measuring apparatus is connected to the rocker, so that a force transmitted to the rocker can be measured by means of the force-measuring apparatus.

In the measuring device of the invention, it is possible to dispense with driving the bearing sleeve in order to avoid frictional forces between the bearing sleeve and the output shaft. An additional gearbox for driving the bearing sleeve is therefore unnecessary. This enables a structurally simple and compact design of the measuring device.

The words "drive" and "output" in the terms "drive shaft" and "output shaft" serve to differentiate the two shafts. The output shaft is a drive element for the measurement wheel because the measurement wheel can be driven via the output shaft. The output shaft, in turn, can be driven via the drive shaft (with the interposition of the gearbox).

The rocker rigidly connected to the bearing sleeve can be made cup-shaped, for example, wherein other designs for the bearing sleeve are possible in principle in addition to a cup-shaped design.

Preferably, the first gearbox element, the second gearbox element, and the intermediate element are each designed as a gear, in particular as a spur gear. It is further preferred if the intermediate element engages with the first and second gearbox element.

The particular gearbox element can be designed as an external or internal gear. Further, the intermediate element can be designed as an external or internal gear.

If the first gearbox element and the intermediate element are each designed as an external gear and the second gearbox element is designed as an internal gear, it is possible to make the measuring device especially compact.

Advantageously, the measuring device comprises at least one bearing which is disposed between the output shaft and the bearing sleeve and by means of which the output shaft is rotatably mounted in the bearing sleeve. This bearing is expediently designed as a radial bearing, in particular as a radial roller bearing.

Furthermore, it is advantageous if the measuring device has at least one bearing for the rotatable mounting of the bearing sleeve. This bearing is expediently designed as a radial bearing, in particular as a radial roller bearing.

The rocker is preferably held in place by the force-measuring apparatus. This is not necessarily to be understood in such a way that the force-measuring apparatus does not allow any rotation of the rocker. Rather, the wording that the rocker is held in place by the force-measuring apparatus can be understood in such a way that the rotatability of the rocker is restricted by the force-measuring apparatus.

If the rocker is held in place by the force-measuring apparatus, the rocker and the bearing sleeve, rigidly connected to the rocker, can preferably only rotate to such a small extent as is permitted by an elastic deformation of the force-measuring apparatus which occurs under the action of a force on the force-measuring apparatus. Such a rotation can be, for example, a rotation with a maximum rotation angle of +/−0.5°.

It is advantageous further if the measuring device has at least one sealing element which seals a gap between the bearing sleeve and the output shaft. This sealing element can serve to protect the gearbox of the measuring device and/or its bearing from contaminant particles, in particular bulk material particles. This sealing element is expediently disposed between the bearing sleeve and the output shaft.

The measuring device preferably comprises an axle element, which is rigidly connected to the rocker and by means of which the intermediate element of the gearbox is supported on the rocker. Furthermore, it is advantageous if the measuring device is equipped with a bearing, which is disposed between the axle element and the intermediate element and by means of which the intermediate element is mounted rotatable about the axle element. This bearing is preferably a radial bearing, in particular a radial roller bearing.

Furthermore, it is preferred if the second gearbox element has an effective diameter that is four times or substantially four times the distance of the axis of rotation of the intermediate element from the axis of rotation of the output shaft. It can be achieved thereby that the force acting on the force-measuring apparatus during the measuring operation of the measuring device is determined only by the braking force acting on the measurement wheel according to the Coriolis principle (due to a deflection of the material flow) and is independent of any friction-related disturbing forces. In particular, it can be achieved by said geometric relationship that the force acting on the force-measuring apparatus in the measuring operation is independent of friction-related disturbing forces which can be attributed to friction between the output shaft and, if applicable, the bearings, disposed between the output shaft and the bearing sleeve, and/or sealing elements.

The measuring device expediently comprises a housing. In particular, the rocker, the gearbox, and the bearing sleeve can be disposed in the housing. The bearing sleeve can be disposed completely or only partially within the housing. Moreover, one or more other elements of the measuring device can be disposed in the housing. The aforementioned bearing for the rotatable mounting of the bearing sleeve is expediently disposed between a housing wall, surrounding the bearing sleeve, and the bearing sleeve.

The housing preferably has an opening through which the output shaft is passed. An interior of the housing can be connected to the surroundings of the housing through this opening.

It is further preferred if the measuring device is equipped with a sealing gas device for introducing sealing gas into the housing. A sealing gas with an increased pressure, for example, with a pressure of 2 bar, is expediently introduced into the housing using the sealing gas device. The sealing gas introduced into the housing preferably serves to prevent contaminant particles, in particular bulk material particles, from penetrating into the housing through said opening.

In an advantageous variant of the invention, the device comprises a floating ring for sealing said opening of the housing. The floating ring can serve in particular to seal said opening in the event of an interruption or failure of the sealing gas supply.

In an advantageous refinement, the rocker has a cylindrical extension. The extension is preferably disposed coaxially to the output shaft.

Moreover, the measuring device can have at least one radial bearing, which is disposed between a wall of the housing and the cylindrical extension of the rocker, for the rotatable mounting of the rocker in the housing. It is advantageous further if the measuring device has an axial bearing on which the cylindrical extension of the rocker is supported. The axial bearing can be designed, for example, as a ball.

In a preferred embodiment, the measuring device has a cross spring element with a plurality of crossing springs. The measuring device advantageously further comprises a support element for the punctual support of the rocker. The rocker is preferably mounted in the housing with the aid of the cross spring element and the support element.

The previously mentioned cross spring element can in particular be designed like the cross spring element described in DE 103 30 947 B4. The springs of the cross spring element can in particular be leaf springs. Expediently, two springs of the cross spring element form a spring pair from two crossing springs. The springs of the cross spring element advantageously cross on the axis of rotation of the output shaft, in particular at a right angle.

The invention further relates to a method for operating a measuring device of the type according to the invention. In this method of the invention, the measurement wheel is driven by means of a drive unit, connected to the drive shaft, and the measurement wheel is acted upon by a material flow, in particular a bulk material flow, wherein the material flow is deflected by the measurement wheel, a reaction force, which is transmitted to the rocker via the intermediate element of the gearbox, acts on the measurement wheel and a measurement signal, dependent on the reaction force, is generated by the force-measuring apparatus, by means of which a mass flow rate of the material flow can be determined.

As mentioned above, the invention also relates to a measuring system. The measuring system of the invention comprises a measuring device of the type according to the invention and an evaluation unit which is designed to determine a mass flow rate of a material flow acting on the measurement wheel of the measuring device using a measurement signal of the force-measuring apparatus of the measuring device.

The evaluation unit of the measuring system is expediently equipped with a data memory for storing software and with a processor for executing software. Software that can be executed by the processor of the evaluation unit is preferably stored in the data memory of the evaluation unit. This software advantageously enables the evaluation unit to determine the mass flow rate of the material flow using the measurement signal from the force-measuring apparatus.

The invention relates further to a method for operating a measuring device of the type according to the invention. In this method of the invention, the measurement wheel is driven by means of a drive unit, connected to the drive shaft, and the measurement wheel is acted upon by a material flow, in particular a bulk material flow, wherein the material flow is deflected by the measurement wheel, a reaction force, which is transmitted to the rocker via the intermediate element of the gearbox, acts on the measurement wheel and a measurement signal, dependent on the reaction force, is generated by the force-measuring apparatus, and wherein a mass flow rate of the material flow is determined by the evaluation unit of the measuring system on the basis of the measurement signal.

A speed of the measurement wheel is advantageously measured. The mass flow rate of the material flow is preferably determined by the evaluation unit using the measured speed of the measurement wheel.

Moreover, as mentioned above, the invention relates to a metering system. The metering system of the invention comprises a measuring device of the invention, a feed unit for introducing the material flow into the measuring device, and an evaluation unit, which is designed to set a defined mass flow rate of the material flow using a measurement signal from the force-measuring apparatus of the measuring device by controlling or regulating a manipulated variable of the feed unit. In this case, manipulated variables can be, for example, the speed of a conveyor element, screw conveyor, star wheel, or conveyor belt, the frequency and/or vibration intensity of a discharge chute, or the opening angle of a rotary slide of a feed unit.

The evaluation unit of the metering system is expediently equipped with a data memory for storing software and with a processor for executing software. Software, which is stored in the data memory of the evaluation unit of the metering system and can be executed by the processor of the evaluation unit, advantageously enables the evaluation unit to set a defined mass flow rate of the material flow using the measurement signal of the force-measuring apparatus by controlling or regulating the manipulated variable of the feed unit.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
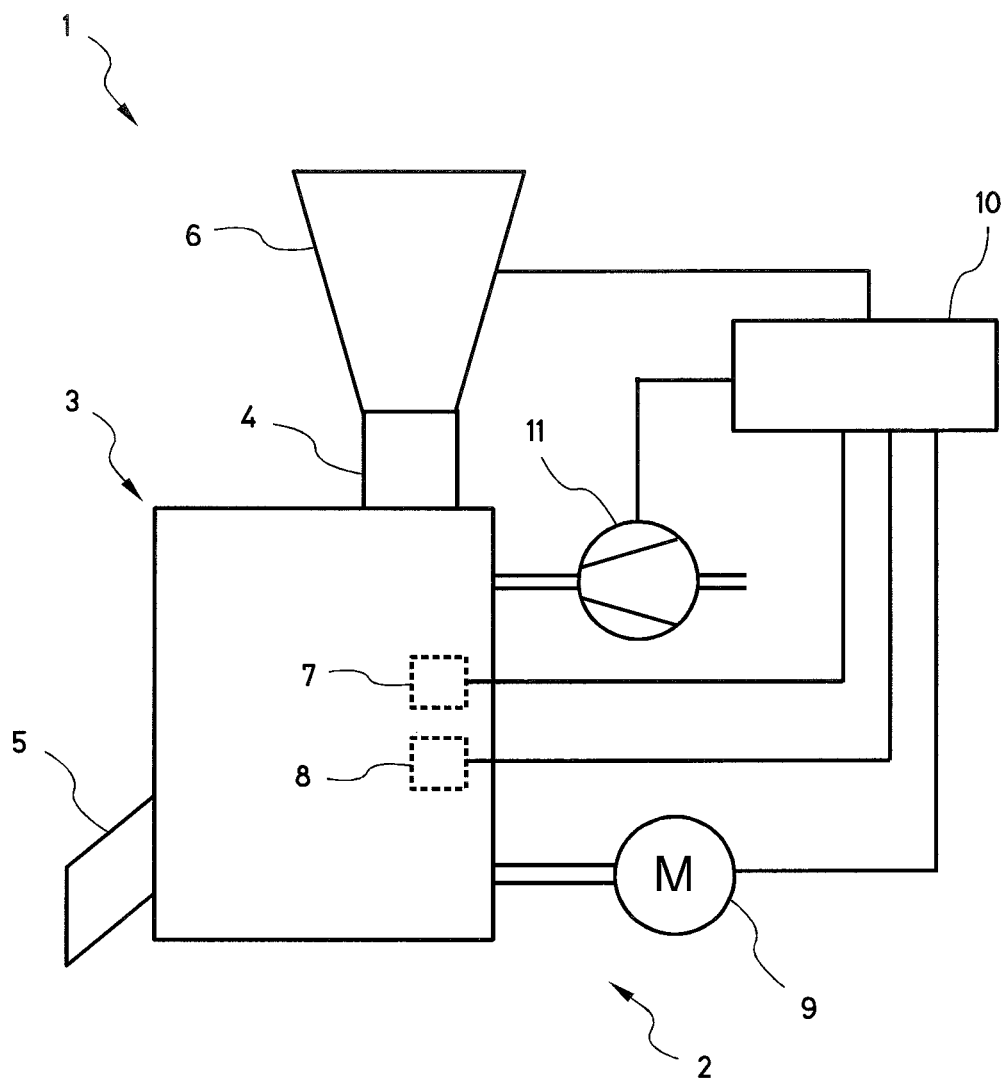
FIG. 1 shows a metering system with a feed unit, a measuring device, an evaluation unit, a compressor, and a drive unit in a schematic representation.

FIG. 1 shows a metering system 1 in a schematic representation. Metering system 1 comprises a measuring system 2 with a measuring device 3 for measuring a mass flow rate of a material flow in accordance with the Coriolis principle. The material flow can in particular be a bulk material flow. The mass flow rate of a material flow of free-flowing bulk material particles, such as coal dust, for example, can be measured in particular with the aid of measuring device 3.

Measuring device 3 comprises, among other things, an inlet 4 and an outlet 5. Inlet 4 of measuring device 3 is connected to a feed unit 6 of metering system 1. In addition, measuring device 3 is equipped with a force-measuring apparatus 7, for example, a double bending beam sensor, and a speed-measuring apparatus 8.

Metering system 1 further comprises a drive unit 9 for driving measuring device 3. Drive unit 9 can be designed, for example, as an electric motor.

In addition to measuring device 3, measuring system 2 comprises an evaluation unit 10 which is connected to drive unit 9, force-measuring apparatus 7, and speed-measuring apparatus 8.

Evaluation unit 10 is designed with the aid of software stored in evaluation unit 10 to process measurement signals from force-measuring apparatus 7 and speed-measuring apparatus 8. Moreover, evaluation unit 10 is designed with the aid of the software stored in evaluation unit 10 to control a rotational speed of drive unit 9 and a manipulated variable of feed unit 6, in particular as a function of the measurement signals of force-measuring apparatus 7 and speed-measuring apparatus 8.

Further, metering system 1 is equipped with a compressor 11 which is connected to evaluation unit 10 and can be controlled by the latter. Compressor 11 is connected to measuring device 3.

Figure 2:
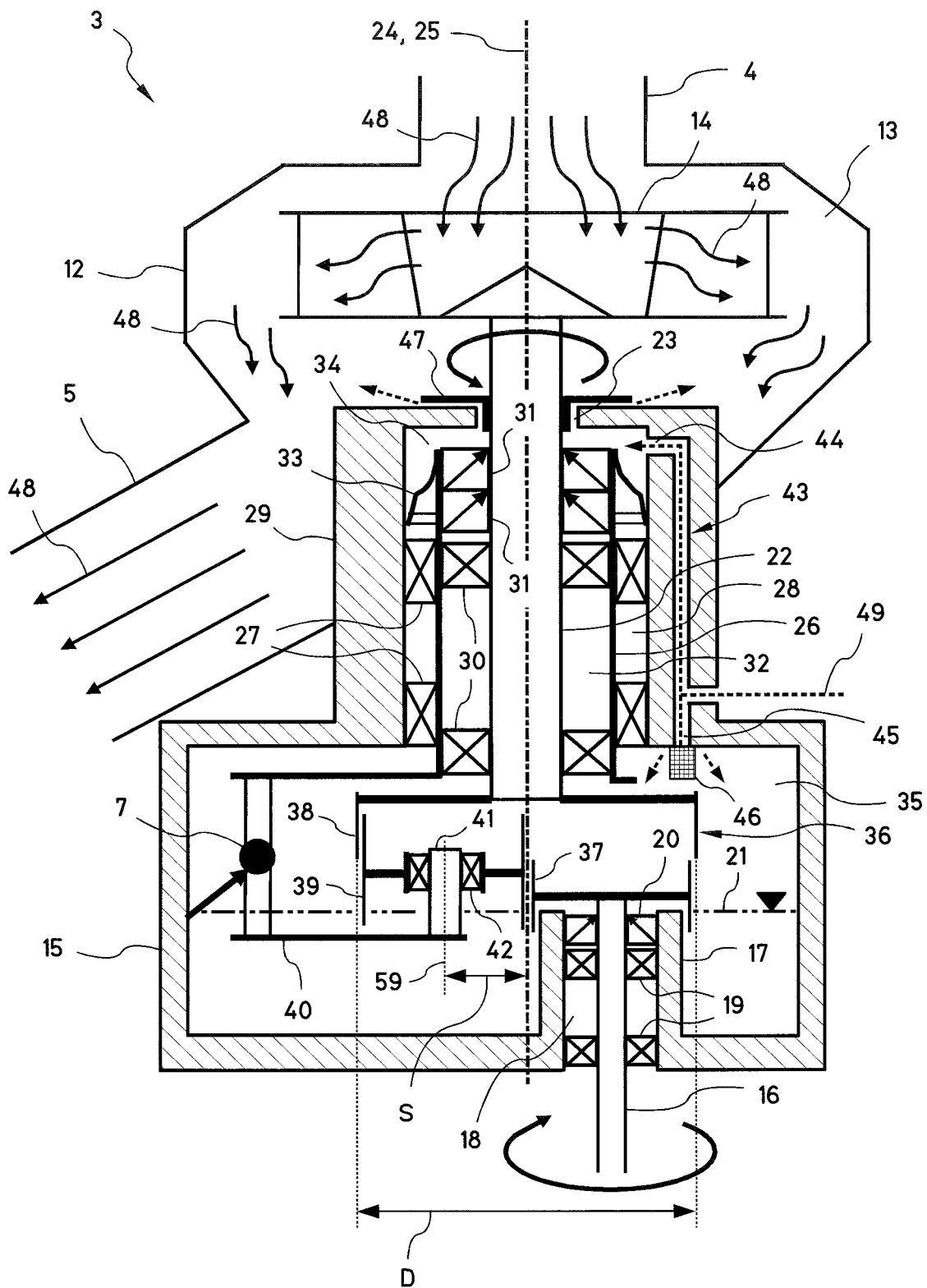
FIG. 2 shows a schematic longitudinal sectional representation of the measuring device of the metering system from FIG. 1.

FIG. 2 shows measuring device 3 from FIG. 1 in a schematic longitudinal sectional representation.

Measuring device 3 comprises a first housing 12 for guiding a material flow. This housing 12 has the aforementioned inlet 4 and the aforementioned outlet 5 (cf. FIG. 1). In addition, first housing 12 has a measurement wheel chamber 13 in which a bladed measurement wheel 14 of measuring device 3 is located.

Further, measuring device 3 comprises a second housing 15, which is partially disposed within first housing 12. Measurement wheel 14 is positioned above second housing 15.

In addition, measuring device 3 comprises a drive shaft 16, which can be driven with the aid of drive unit 9 from FIG. 1 and is partially disposed within second housing 15. Part of drive shaft 16 is surrounded by a hollow cylindrical inner wall 17 of second housing 15.

Within a gap 18 between drive shaft 16 and said inner wall 17 of second housing 15, measuring device 3 has two bearings 19 designed as radial roller bearings, by means of which drive shaft 16 is rotatably mounted. Further, measuring device 3 has a sealing element 20, which seals gap 18, within gap 18 between drive shaft 16 and inner wall 17 of second housing 15.

For a better ease of movement of drive shaft 16, measuring device 3 has a lubricant charge 21 in second housing 15. Oil is preferably used as the lubricant.

Further, measuring device 3 is equipped with an output shaft 22, which is rigidly connected to measurement wheel 14. Output shaft 22 is partially disposed within second housing 15, wherein output shaft 22 is passed through an opening 23 of second housing 15, said opening being located within measurement wheel chamber 13 of first housing 12. In addition, output shaft 22 has an axis of symmetry 24, which at the same time is the common axis of rotation 25 of output shaft 22 and measurement wheel 14.

Moreover, measuring device 3 has an axially symmetrical bearing sleeve 26 for the rotatable mounting of output shaft 22; it surrounds a part of output shaft 22 and is disposed within second housing 15.

In the present exemplary embodiment, measuring device 3 comprises two bearings 27, designed as radial roller bearings, for the rotatable mounting of bearing sleeve 26. These two bearings 27 are disposed in a gap 28 between a hollow cylindrical wall 29 of second housing 15, said wall surrounding bearing sleeve 26, and bearing sleeve 26.

Moreover, measuring device 3 in the present exemplary embodiment has two further bearings 30, which are designed as radial roller bearings and are disposed between bearing sleeve 26 and output shaft 22. Output shaft 22 is rotatably mounted in bearing sleeve 26 by means of these two bearings 30.

Further, measuring device 3 comprises two sealing elements 31, which are disposed between output shaft 22 and bearing sleeve 26 and seal a gap 32 between output shaft 22 and bearing sleeve 26 in a dust-tight and gas-tight manner.

Moreover, measuring device 3 has a flexible sealing element 33, which is fastened to second housing 15 and is in contact with output shaft 22. This sealing element 33 has a front side facing measurement wheel 14 and a rear side facing away from measurement wheel 14 and divides the interior of second housing 15 in a gas-tight and dust-tight manner into a first subspace 34, adjacent to the front side of sealing element 33, and a second subspace 35, adjacent to the rear side of sealing element 33. Gap 28 between bearing sleeve 26 and wall 29 surrounding bearing sleeve 26 is sealed with the aid of this sealing element 33.

In addition, measuring device 3 comprises a gearbox 36 disposed in second housing 15 for transmitting a torque from drive shaft 16 to output shaft 22. This gearbox 36 comprises a first gearbox element 37 rigidly connected to drive shaft 16, a second gearbox element 38 rigidly connected to output shaft 22, and an intermediate element 39 for transmitting a torque from first gearbox element 37 to second gearbox element 38.

First and second gearbox element 37, 38 and intermediate element 39 are each designed as a gear, more precisely as a spur gear, wherein intermediate element 39 is engaged with first and second gearbox element 37, 38. In the present exemplary embodiment, first gearbox element 37 and intermediate element 39 are each designed as an external gear, whereas second gearbox element 38 is designed as an internal gear.

Further, first gearbox element 37 and intermediate element 39 are dimensioned the same in the present exemplary embodiment. First gearbox element 37 and intermediate element 39 thus have in particular the same effective diameter (also called a pitch circle diameter). Second gearbox element 38, in contrast, has a larger effective diameter than first gearbox element 37 and intermediate element 39.

In addition to the mentioned three gears of gearbox 36, therefore, first and second gearbox element 37, 38 and intermediate element 39, measuring device 3 comprises no further gears.

Further, measuring device 3 in second housing 15 has a rocker 40 rigidly connected to bearing sleeve 26. The aforementioned force-measuring apparatus 7 of measuring device 3 is connected to rocker 40, so that a force transmitted to rocker 40 can be measured by means of force-measuring apparatus 7.

Furthermore, measuring device 3 comprises an axle element 41, which is rigidly connected to rocker 40 and by means of which intermediate element 39 is supported on rocker 40, and a bearing 42, which is disposed between axle element 41 and intermediate element 39 and by means of which intermediate element 39 is rotatably mounted around axle element 41. The last-mentioned bearing 42 is formed as a radial roller bearing. Said axle element 41 is arranged parallel to output shaft 22, wherein axis of symmetry 59 of axle element 41 has a distance S from axis of rotation 25 of output shaft 22, which corresponds to a fourth of the effective diameter D of second gearbox element 38.

Rocker 40 is held in place by force-measuring apparatus 7. As a result, bearing sleeve 26 and rocker 40 can only rotate to such a small extent as is permitted by an elastic deformation of force-measuring apparatus 7, which occurs under the action of a force on force-measuring apparatus 7.

In addition, measuring device 3 is equipped with a sealing gas device 43 for introducing sealing gas into second housing 15. Sealing gas device 43 comprises a first sealing gas inlet 44 for introducing sealing gas into first subspace 34 of second housing 15 and a second sealing gas inlet 45 for introducing sealing gas into second subspace 35 of second housing 15. In the present exemplary embodiment, second sealing gas inlet 45 has an optional filter element 46 for filtering the sealing gas. Filter element 46 can be used to prevent contaminants from being introduced into lubricant charge 21 via second sealing gas inlet 45.

Moreover, measuring device 3 comprises a floating ring 47 through which output shaft 22 of measuring device 3 is passed. Floating ring 47 serves to seal opening 23 of second housing 15, which opening is disposed in measurement wheel chamber 13 and through which output shaft 22 is passed, in particular in the event of an interruption or failure of the sealing gas supply.

During operation of metering system 1 from FIG. 1, drive shaft 16 of measuring device 3 is driven with the aid of drive unit 9 of metering system 1 such that measurement wheel 14 rotates at a constant speed. Gearbox 36 of measuring device 3 hereby transmits a torque from drive shaft 16 to output shaft 22, which in turn drives measurement wheel 14.

If a material flow 48, for example, a bulk material flow, is introduced into inlet 4 of measuring device 3 with the aid of feed unit 6 of metering system 1, material flow 48 strikes measurement wheel 14 from above.

Material flow 48 is deflected radially outward by measurement wheel 14. Due to the Coriolis principle, a reaction force, which is proportional to the mass flow rate of mass flow 48, acts on measurement wheel 14. This reaction force is transmitted via second gearbox element 38 to intermediate element 39 of gearbox 36. The reaction force is transmitted to rocker 40 via intermediate element 39. The reaction force transmitted to rocker 40 acts on force-measuring apparatus 7 which is connected to rocker 40 and which generates a measurement signal dependent on the reaction force and transmits this measurement signal to evaluation unit 10 from FIG. 1.

The force acting on force-measuring apparatus 7 is freed from friction-related disturbing forces which can be attributed to friction between output shaft 22 and bearings 30, disposed between output shaft 22 and bearing sleeve 26, and sealing elements 31. In other words, only the relevant reaction force acting on measurement wheel 14 due to the deflection of material flow 48 is detected by force-measuring apparatus 7.

Mass flow 48 deflected by measurement wheel 14 is guided from first housing 12 to its outlet 5 from where material flow 48 leaves first housing 12.

A measurement signal dependent on the speed of measurement wheel 14 is generated by speed-measuring apparatus 8 (not shown in FIG. 2) and this measurement signal is transmitted to evaluation unit 10.

On the basis of the measurement signals which evaluation unit 10 receives from force-measuring apparatus 7 and speed-measuring apparatus 8, evaluation unit 10 determines the mass flow rate of material flow 48.

In order to obtain a defined mass flow rate of material flow 48 which can be predefined by a user, evaluation unit 10 sets a manipulated variable of feed unit 6 from FIG. 1 to a suitable value.

With the aid of compressor 11 from FIG. 1, measuring device 3 is supplied with a sealing gas 49. Via first sealing gas inlet 44, sealing gas 49 is introduced into first subspace 34 of second housing 15 at an increased pressure, for example, with a pressure of 2 bar. For example, air can be used as sealing gas 49.

Sealing gas 49, introduced into first subspace 34, flows out of first subspace 34 in the direction of measurement wheel 14 out of second housing 15 via opening 23 of second housing 15, through which output shaft 22 is passed. In this way, penetration of particles, in particular bulk material particles, into second housing 15 is prevented or at least reduced. Sealing gas 49 generates no or only negligible frictional forces thereby on output shaft 22.

The pressure of sealing gas 49 can be set as a function of the pressure prevailing in measurement wheel chamber 13. The pressure of sealing gas 49 is expediently set such that it lies above the pressure in measurement wheel chamber 13. As a result, the penetration of (bulk material) particles into second housing 15 can also be avoided in the case of a pressurized feeding of material flow 48.

A possible deformation of flexible sealing element 33 which seals gap 28 between second housing 15 and bearing sleeve 26, said deformation being due to the increased sealing gas pressure in first subspace 34, can cause this sealing element 33 to contact bearing sleeve 26 such that sealing element 33 exerts an undesirable friction/braking torque on bearing sleeve 26 during operation of measuring device 3, which leads to measurement errors. In order to prevent flexible sealing element 33 from being deformed by the increased sealing gas pressure in first subspace 34, sealing gas 49 is also introduced into second subspace 35 via second sealing gas inlet 45. In this way, the front and rear sides of flexible sealing element 33 are subjected to the same sealing gas pressure, so that a pressure-related deformation of flexible sealing element 33 is prevented.

With the aid of flexible sealing element 33, which seals gap 28 between second housing 15 and bearing sleeve 26, it can be prevented that (bulk material) particles enter said gap 28 in the event of an interruption or failure of the sealing gas supply. Flexible sealing element 33 thus serves in particular to protect bearings 27 located in gap 28 between second housing 15 and bearing sleeve 26.

If the pressure difference from the pressure in first subspace 34 and the pressure in measurement wheel chamber 13 is above a predetermined pressure value, sealing gas 49 can escape from first subspace 34 via said opening 23. In this case, floating ring 47 is held "in suspension" by the escaping sealing gas. The escaping sealing gas 49 prevents or at least reduces (bulk material) particles from entering gap 28 between bearing sleeve 26 and wall 29 of second housing 15, said wall surrounding bearing sleeve 26.

If the pressure difference from the pressure in first subspace 34 and the pressure in measurement wheel chamber 13 falls below the predetermined pressure value (for example, due to an interruption or failure of the sealing gas supply), floating ring 47 automatically closes said opening 23 of second housing 15 and thereby prevents (bulk material) particles from entering gap 28 between bearing sleeve 26 and wall 29 of second housing 15, said wall surrounding bearing sleeve 26.

Figure 3:
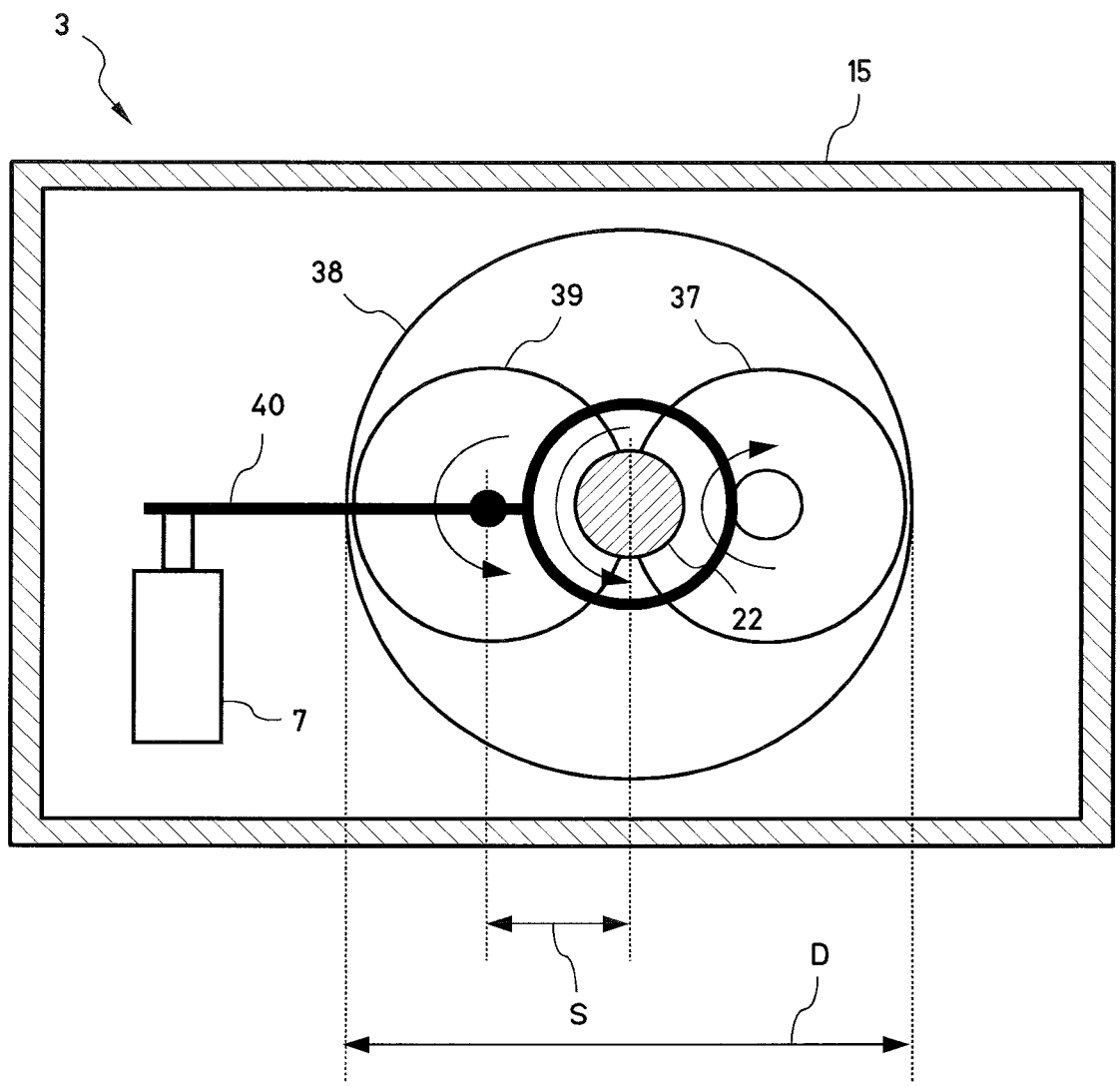
FIG. 3 shows a schematic cross-sectional representation of the measuring device from FIG. 2.

FIG. 3 shows a schematic cross-sectional representation of measuring device 3 from FIG. 2.

In FIG. 3, first and second gearbox element 37, 38 and intermediate element 39 of gearbox 36 are shown. Moreover, force-measuring apparatus 7, rocker 40, output shaft 22, and second housing 15 of measuring device 3 are shown in FIG. 3.

Furthermore, exemplary directions of rotation of first and second gearbox elements 37, 38 and of intermediate element 39 are drawn in FIG. 3. If first gearbox element 37 is driven such that first gearbox element 37 rotates clockwise (in the perspective from FIG. 3), intermediate element 39 rotates counterclockwise. Because second gearbox element 38 is designed as an internal gear, second gearbox element 38 and output shaft 22, rigidly connected to second gearbox element 38, likewise rotate counterclockwise in this case. That is, intermediate element 39 has the same direction of rotation as second gearbox element 38 and output shaft 22, whereas the direction of rotation of first gearbox element 37 is opposite to the direction of rotation of second gearbox element 38, intermediate element 39, and output shaft 22.

Figure 4:
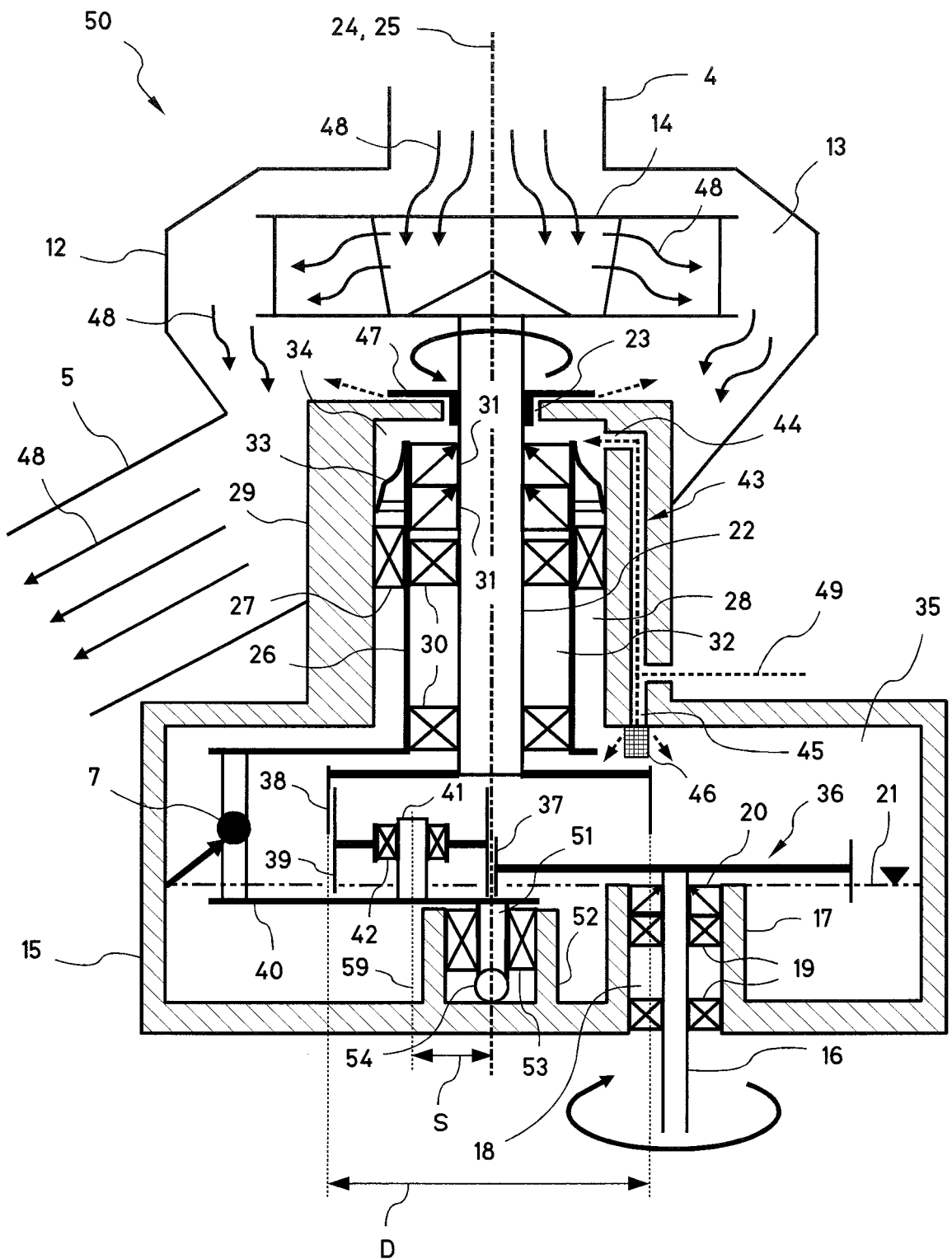
FIG. 4 shows a schematic longitudinal sectional representation of another embodiment variant of a measuring device for a metering system.

FIG. 4 shows a schematic longitudinal sectional representation of a further embodiment variant of a measuring device 50 for measuring a mass flow rate of a material flow, in particular a bulk material flow, according to the Coriolis principle. This measuring device 50 can be used, for example, instead of measuring device 3 from FIG. 2 in metering system 1 from FIG. 1.

The following explanations regarding measuring device 50 from FIG. 4 relate primarily to the differences from measuring device 3 from FIG. 2, to which reference is made with regard to the same features and functions.

In the embodiment variant from FIG. 4, first gearbox element 37 and intermediate element 39 of gearbox 36 are dimensioned differently. That is, first gearbox element 37 and intermediate element 39 have different effective diameters.

Further, rocker 40 has a cylindrical extension 51. Extension 51 of rocker 40 is disposed below output shaft 22. In addition, extension 51 is arranged coaxially to output shaft 22. Axis of symmetry 24 of output shaft 22 thus simultaneously forms the axis of symmetry of extension 51. In addition, second housing 15 has a hollow cylindrical inner wall 52 which surrounds extension 51 of rocker 40.

Instead of two bearings 27, which are disposed between bearing sleeve 26 and wall 29 of second housing 15, said wall surrounding bearing sleeve 26, measuring device 50 from FIG. 4 has only one such bearing 27. However, this measuring device 50 has a radial bearing 53, which is designed as a roller bearing and which is disposed between extension 51 and inner wall 52 of second housing 15, said wall surrounding extension 51, for the rotatable mounting of rocker 40.

In addition, measuring device 50 from FIG. 4 has in second housing 15 an axial bearing 54 which is designed as a ball and on which extension 51 of rocker 40 is supported. Extension 51 of rocker 40, axial bearing 54, and radial bearing 53, disposed between extension 51 and inner wall 52 surrounding the extension 51, are located within lubricant charge 21, which has an advantageous effect on the smooth movement of radial bearing 53 and axial bearing 54.

Said axial bearing 54 absorbs axial forces at points on axis of rotation 25 of output shaft 22. Possible frictional forces between second housing 15 and rocker 40 or between second housing 15 and bearing sleeve 26 therefore do not have an effective lever arm. Radial bearing 53 between extension 51 and inner wall 52, surrounding extension 51, and bearing 27 between bearing sleeve 26 and wall 29, surrounding bearing sleeve 26, therefore do not have to absorb any axial forces but only radial forces.

Figure 5:
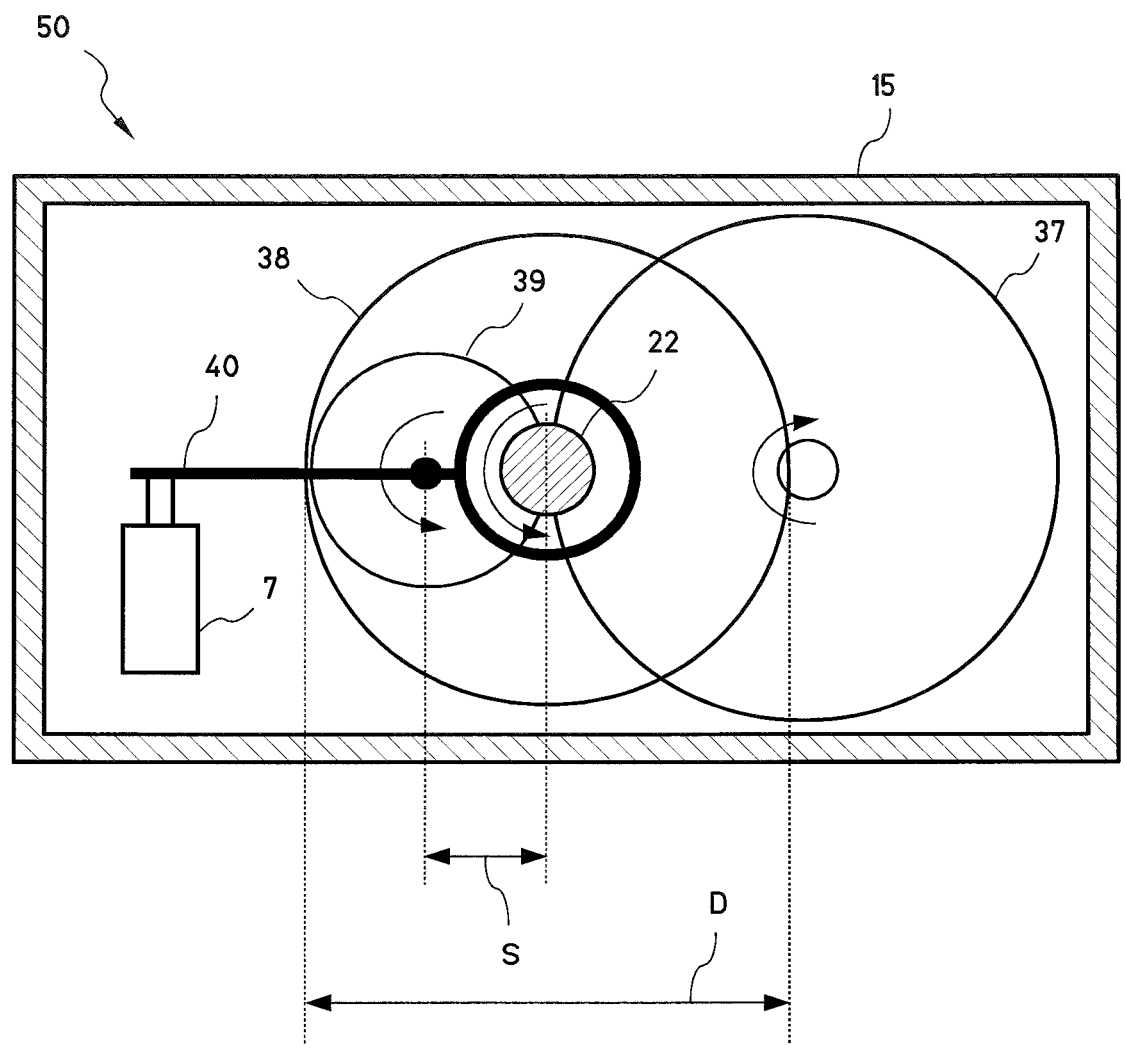
FIG. 5 shows a schematic cross-sectional representation of the measuring device from FIG. 4.

FIG. 5 shows a schematic cross-sectional representation of measuring device 50 from FIG. 4.

Analogous to FIG. 3, first and second gearbox element 37, 38, intermediate element 39, force-measuring apparatus 7, rocker 40, output shaft 22, and second housing 15 of measuring device 50 from FIG. 4 are drawn in FIG. 5. Likewise, exemplary directions of rotation of first and second gearbox elements 37, 38 and of intermediate element 39 are drawn in FIG. 5.

As can be seen from FIG. 5, first gearbox element 37 in the present embodiment variant has a larger effective diameter than intermediate element 39 and second gearbox element 38.

Figure 6:
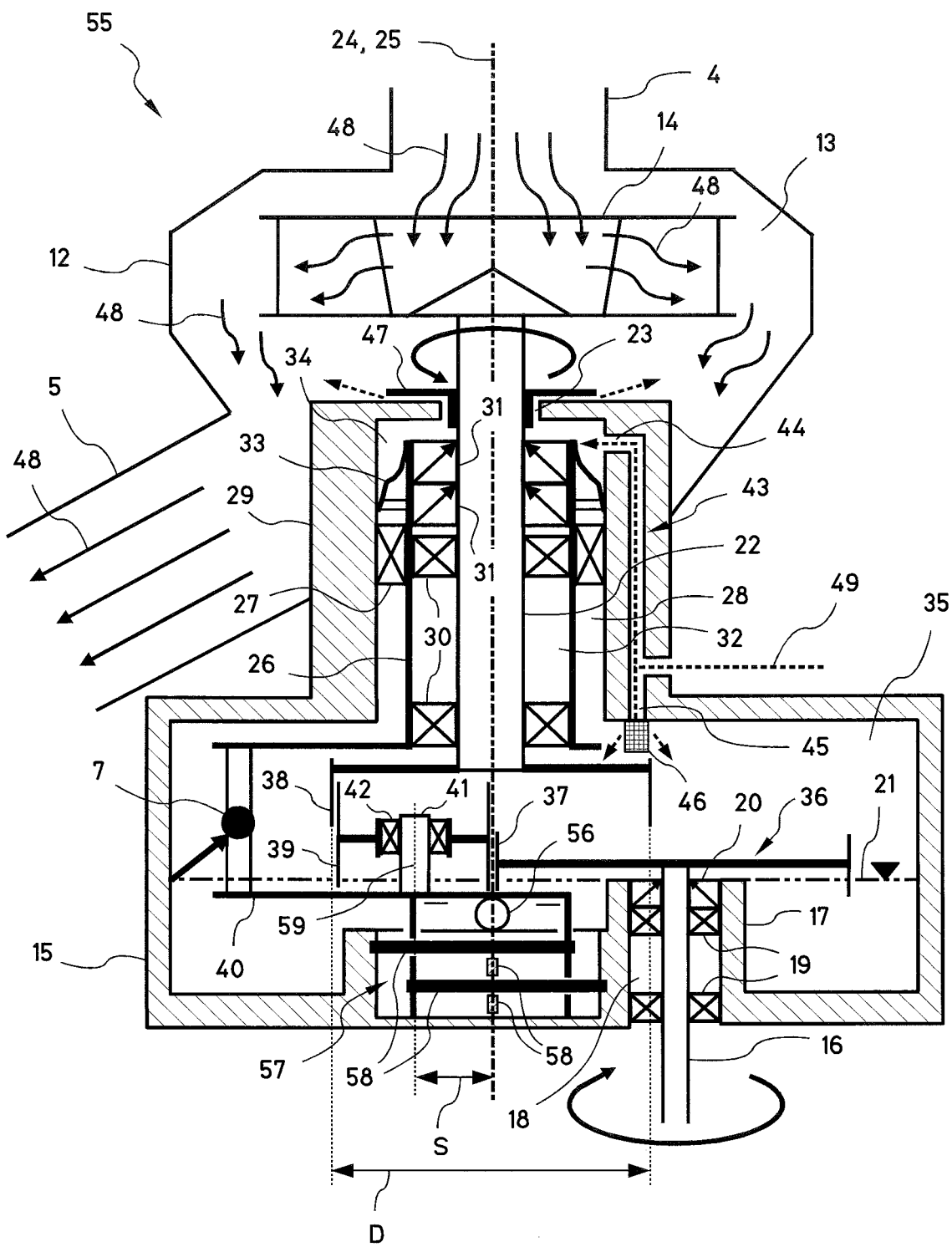
FIG. 6 shows a schematic longitudinal sectional representation of a further embodiment variant of a measuring device for a metering system.

FIG. 6 shows a schematic longitudinal sectional representation of a further embodiment variant of a measuring device 55 for measuring a mass flow rate of a material flow, in particular a bulk material flow, according to the Coriolis principle. This measuring device 55 can be used, for example, instead of measuring device 3 from FIG. 2 in metering system 1 from FIG. 1.

The following explanations regarding measuring device 55 from FIG. 6 relate primarily to the differences from measuring device 3 from FIG. 2, to which reference is made with regard to the same features and functions.

In the embodiment variant from FIG. 6, first gearbox element 37 has a larger effective diameter than intermediate element 39 and second gearbox element 38.

In addition, instead of two bearings 27, which are disposed between bearing sleeve 26 and wall 29 of second housing 15, said wall surrounding bearing sleeve 26, measuring device 55 from FIG. 6 has only one such bearing 27.

In the present embodiment variant, measuring device 55 has a support element 56, which is designed as a ball and on which rocker 40 is supported at points on axis of rotation 25 of output shaft 22. Moreover, measuring device 55 comprises a double-acting cross spring element 57, on which support element 56 is supported and which is designed like the cross spring element described in DE 103 30 947 B4. Cross spring element 57 comprises two leaf springs pairs, each with two leaf springs 58, wherein the two leaf springs 58 of the respective leaf spring pair cross on axis of rotation 25 of output shaft 22, in particular at a right angle.

Rocker 40 is mounted in second housing 15 with the aid of support element 56 and cross spring element 57. This type of mounting is characterized by a high level of insensitivity to contaminant particles in lubricant charge 21 and a substantially frictionless movement of rocker 40.

The invention has been described in detail with reference to the illustrated exemplary embodiments. Nevertheless, the invention is not limited to or by the examples disclosed. Other variants can be derived by the skilled artisan from these exemplary embodiments without departing from the ideas underlying the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A measuring device for measuring a mass flow rate of a material flow in accordance with the Coriolis principle, the measuring device comprising:
   a rotatably mounted, bladed measurement wheel for deflecting the material flow;
   a drive shaft for driving the measurement wheel;
   an output shaft rigidly connected to the measurement wheel;
   a bearing sleeve surrounding at least part of the output shaft for the rotatable mounting of the output shaft;
   a force measuring apparatus;
   a gearbox that has a first gearbox element rigidly connected to the drive shaft, a second gearbox element rigidly connected to the output shaft, and an intermediate element for transmitting a torque from the first gearbox element to the second gearbox element; and
   a rocker that is rigidly connected to the bearing sleeve and on which the intermediate element of the gearbox is mounted,
   wherein the force-measuring apparatus is connected to the rocker so that a force transmitted to the rocker is measured via the force-measuring apparatus.

2. The measuring device according to claim 1, wherein the first gearbox element, the second gearbox element, and the intermediate element are each designed as a gear or a spur gear, and wherein the intermediate element engages with the first and second gearbox element.

3. The measuring device according to claim 1, wherein the first gearbox element and the intermediate element are each designed as an external gear and the second gearbox element is designed as an internal gear.

4. The measuring device according to claim 1, further comprising at least one bearing, which is disposed between the output shaft and the bearing sleeve and via which the output shaft is rotatably mounted in the bearing sleeve.

5. The measuring device according to claim 1, further comprising at least one bearing for the rotatable mounting of the bearing sleeve.

6. The measuring device according to claim 1, wherein the rocker is held in place by the force-measuring apparatus.

7. The measuring device according to claim 1, further comprising at least one sealing element that seals a gap between the bearing sleeve and the output shaft.

8. The measuring device according to claim 1, further comprising an axle element, which is rigidly connected to the rocker and via which the intermediate element of the gearbox is supported on the rocker; and a bearing, which is disposed between the axle element and the intermediate element and via which the intermediate element is mounted rotatable about the axle element.

9. The measuring device according to claim 8, wherein the axle element is rigidly connected directly to the rocker.

10. The measuring device according to claim 1, further comprising a housing in which the rocker, the gearbox, and the bearing sleeve are disposed.

11. The measuring device according to claim 10, further comprising a floating ring for sealing an opening of the housing through which the output shaft is passed, wherein the output shaft is passed through the floating ring, wherein the floating ring is axially displaceable, such that when gas flows through the housing, the floating ring is displaced in a direction away from the opening of the housing by the gas.

12. The measuring device according to claim 10, further comprising a sealing gas device for introducing sealing gas into the housing.

13. The measuring device according to claim 10, further comprising at least one radial bearing disposed between a wall of the housing and a cylindrical extension of the rocker for the rotatable mounting of the rocker in the housing and an axial bearing on which the cylindrical extension of the rocker is supported.

14. The measuring device according to claim 10, further comprising a cross spring element, which comprises a plurality of crossing springs, and a support element for the punctual support of the rocker, wherein the rocker is mounted in the housing with the aid of the cross spring element and the support element.

15. The measuring device according to claim 10, wherein the measuring device includes only three gears, the three gears being the first gearbox element, the second gearbox element and the intermediate element.

16. A method for operating a measuring device according to claim 1, the method comprising:
    driving the measurement wheel via a drive unit connected to the drive shaft; and
    acting upon the measurement wheel by the material flow;
    deflecting the material flow by the measurement wheel, wherein a reaction force, which is transmitted to the rocker via the intermediate element of the gearbox, acts on the measurement wheel; and
    generating a measurement signal, dependent on the reaction force, by the force-measuring apparatus via which a mass flow rate of the material flow is determined.

17. A measuring system comprising a measuring device according to claim 1; and an evaluation unit which is designed to use a measurement signal from the force-measuring apparatus of the measuring device to determine a mass flow rate of the material flow acting on the measurement wheel of the measuring device.

18. A method for operating a measuring system according to claim 17, the method comprising:
    driving the measurement wheel by a drive unit connected to the drive shaft;
    acting upon the measurement wheel by the material flow,
    deflecting the material flow by the measurement wheel, wherein a reaction force, which is transmitted to the rocker via the intermediate element of the gearbox acts on the measurement wheel;
    generating a measurement signal, dependent on the reaction force, by the force measuring apparatus; and
    determining a mass flow rate of the material flow by the evaluation unit of the measuring system on the basis of the measurement signal.

19. The method according to claim 18, wherein a speed of the measurement wheel is measured and the mass flow rate of the material flow is determined by the evaluation unit using the measured speed of the measurement wheel.

20. A metering system comprising:
    a measuring device according to claim 1;
    a feed unit for introducing the material flow into the measuring device; and
    an evaluation unit, which is designed to set a defined mass flow rate of the material flow using a measurement signal from the force-measuring apparatus of the measuring device by controlling or regulating a manipulated variable of the feed unit.

* * * * *